United States Patent [19]
Wolf

[11] 4,208,833
[45] Jun. 24, 1980

[54] REALISTIC DRIVING TOY

[76] Inventor: Tobin Wolf, 285 Aycrigg Ave., Passaic, N.J. 07055

[21] Appl. No.: 914,230

[22] Filed: Jun. 9, 1978

[51] Int. Cl.² .............................................. A63H 33/26
[52] U.S. Cl. ...................................... 46/240; 46/253; 273/1 M
[58] Field of Search ................. 46/236, 238, 239, 240, 46/253; 273/1 M; 74/422; 254/95, 97; 194/9 R, DIG. 18; 33/1 M; 35/11 R

[56] References Cited
U.S. PATENT DOCUMENTS

| | | | |
|---|---|---|---|
| 3,231,988 | 2/1966 | Freyde | 46/253 |
| 4,106,768 | 8/1978 | Kanno | 46/240 |

*Primary Examiner*—Houston S. Bell, Jr.
*Attorney, Agent, or Firm*—Jay M. Cantor

[57] ABSTRACT

A realistic driving toy which includes a vehicle driven by a magnet which moves along the vector sum of a pair of moving rods, the rods being movable normal to each other in a plane by means of motors and linking elements. The motors are controlled by a series of contacts which communicate with a printed circuit disc whereby rotation of a steering wheel rotates the printed circuit disc relative to the contacts to provide different combinations of motor "on-off" conditions as well as different combinations therewith of motor rotation direction conditions to provide magnet movement in eight different directions. In accordance with a second embodiment of printed circuit board, sixteen vector directions for magnet movement are provided by the addition of resistors across certain ones of the circuit paths of the printed circuit board and an alteration of the conductive paths. Provision is made for initial location of the magnet. The rods are driven by a chain, screw or belt drive.

The vehicle includes a forward magnet and a pair of adjacent rearward pins for supporting the vehicle on the board to prevent a "a fishtailing" effect upon vehicle movement.

24 Claims, 22 Drawing Figures

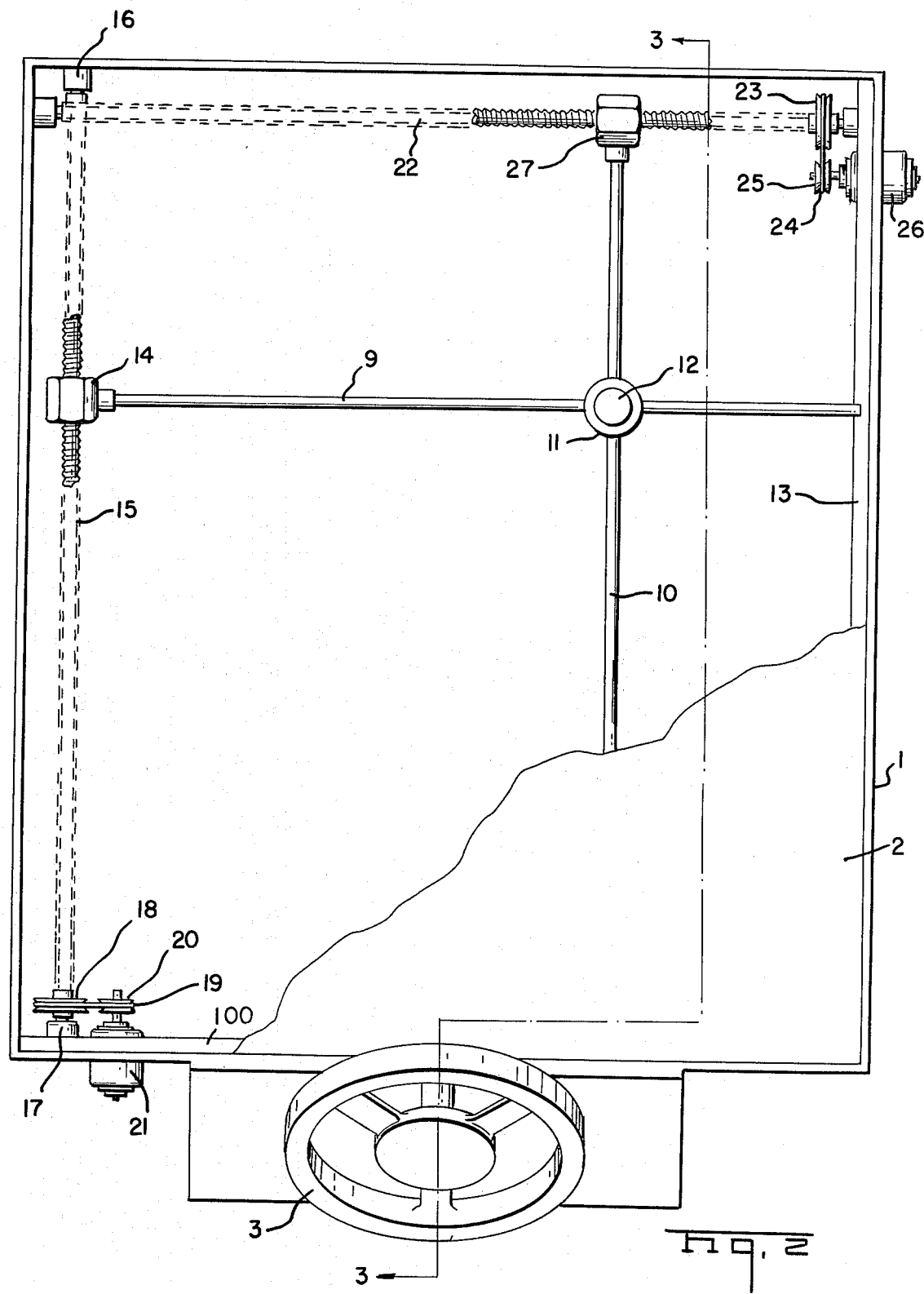

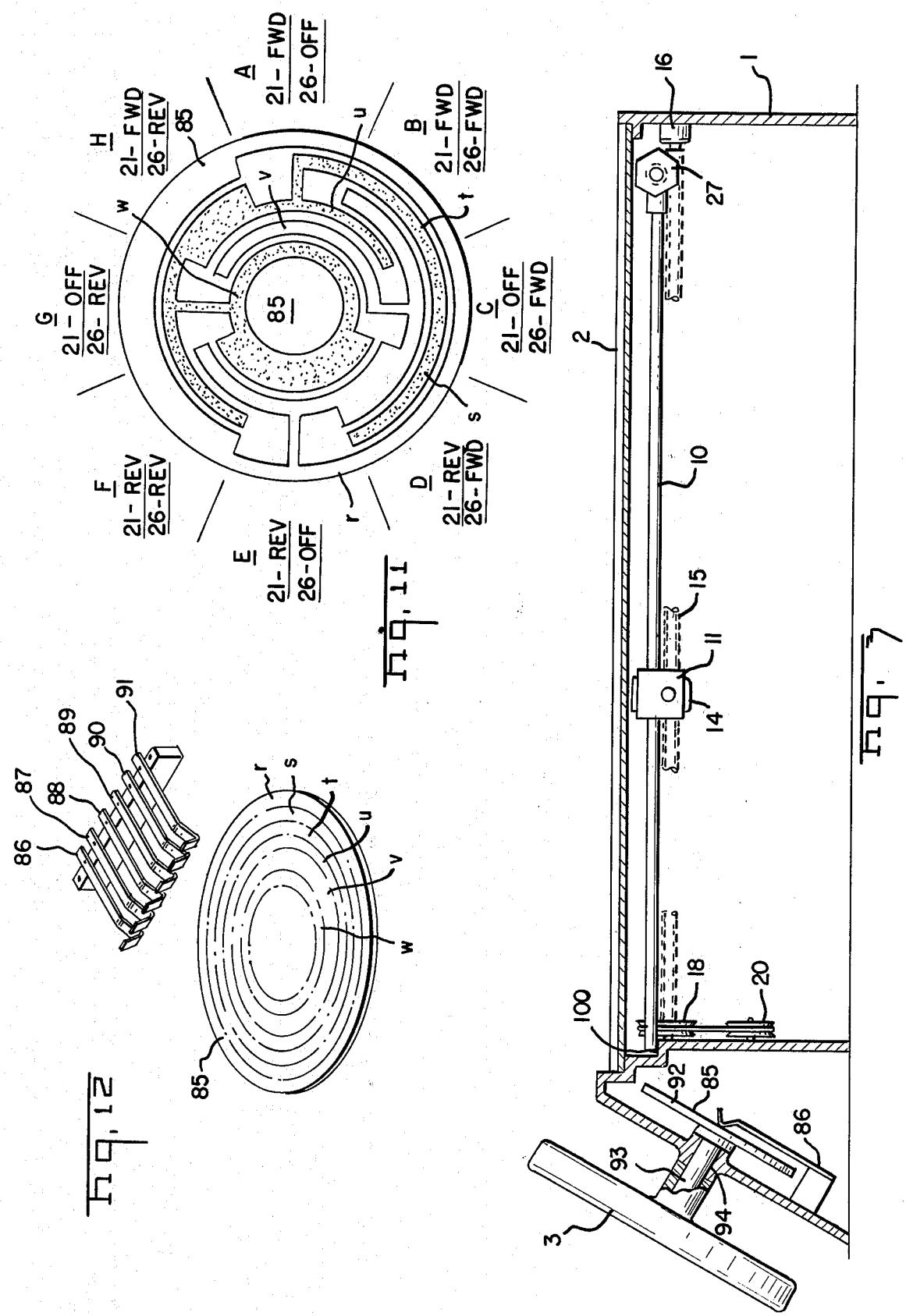

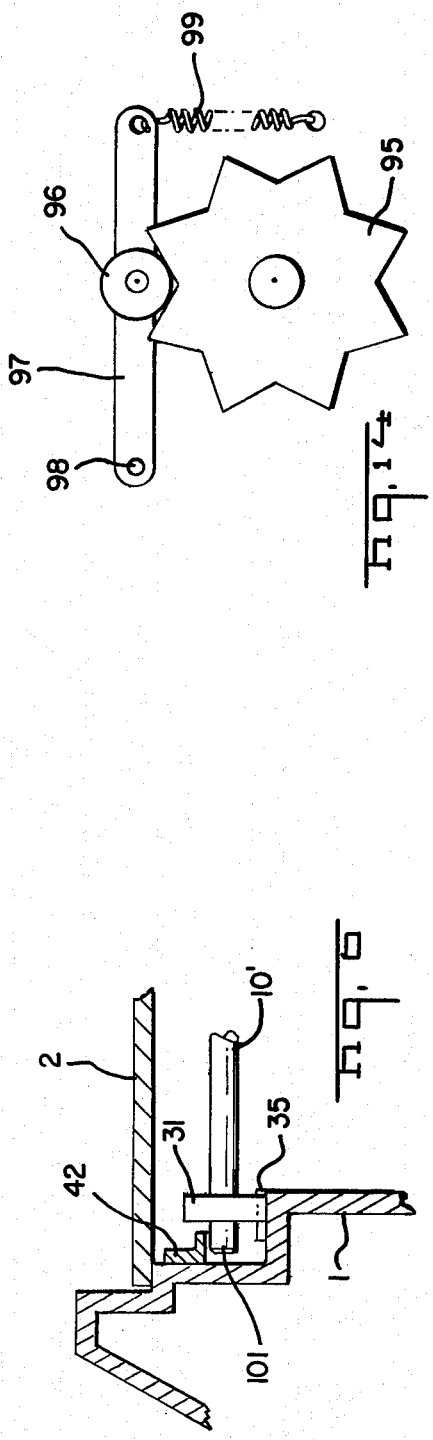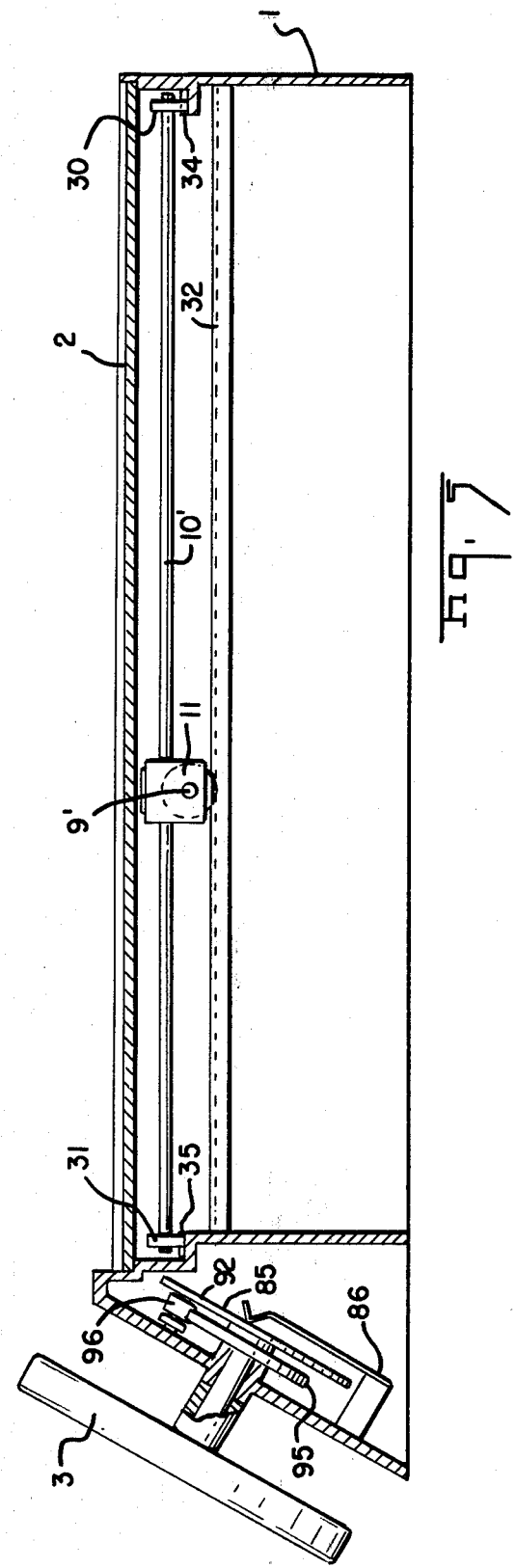

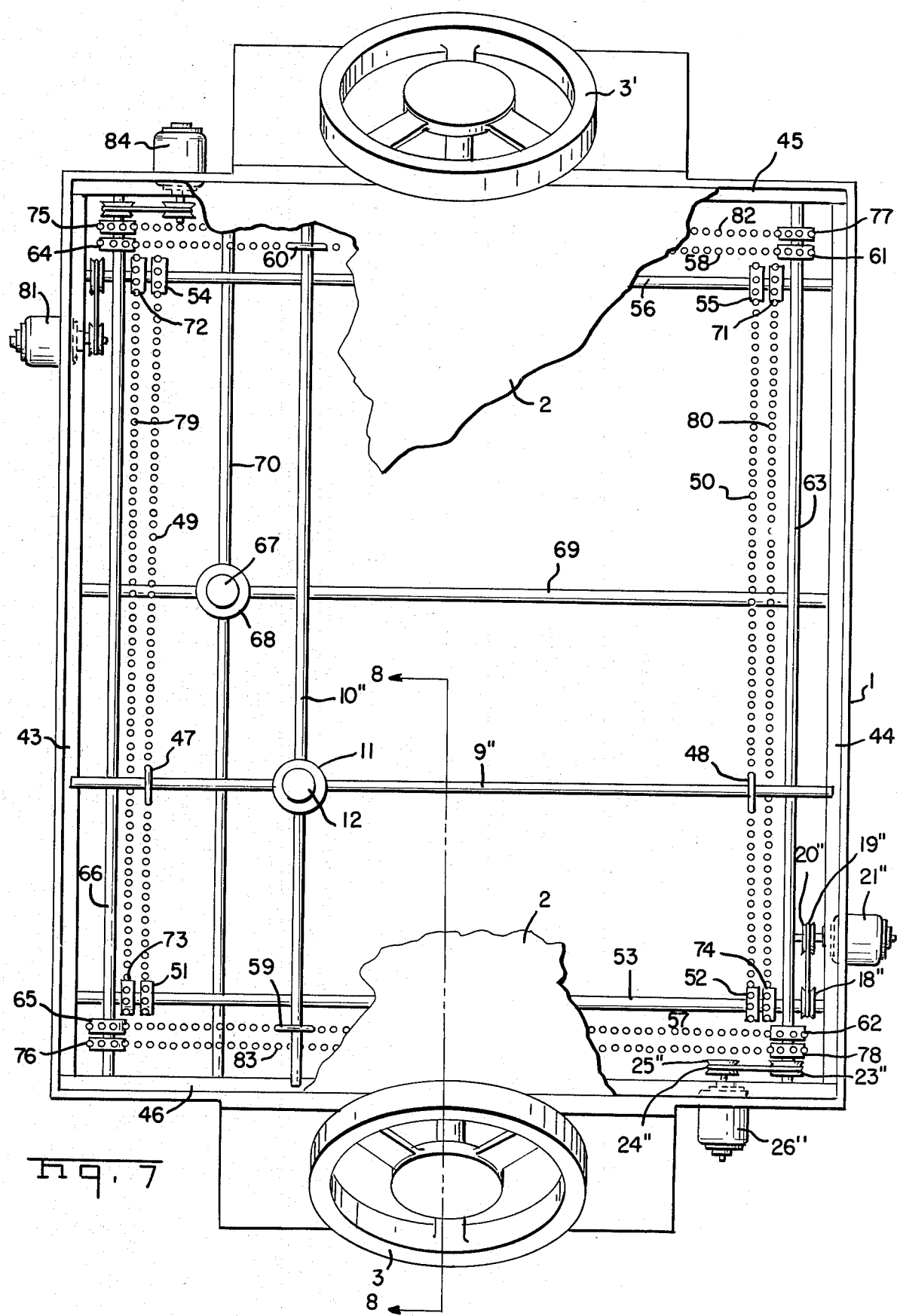

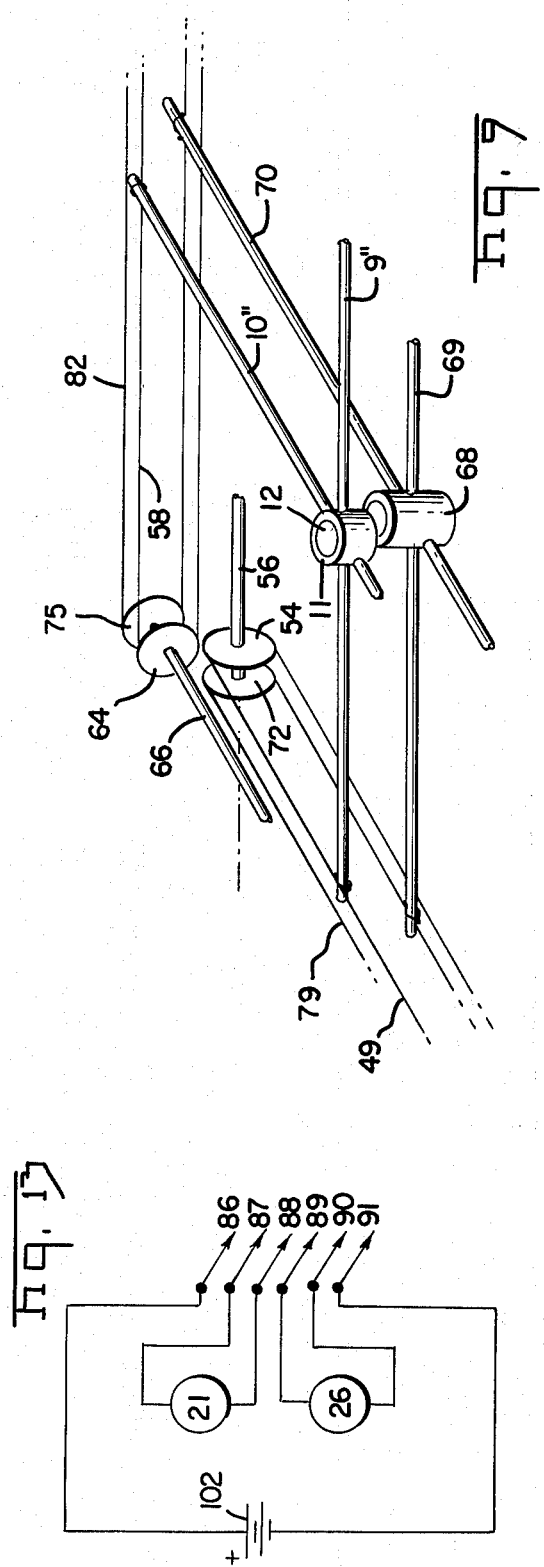

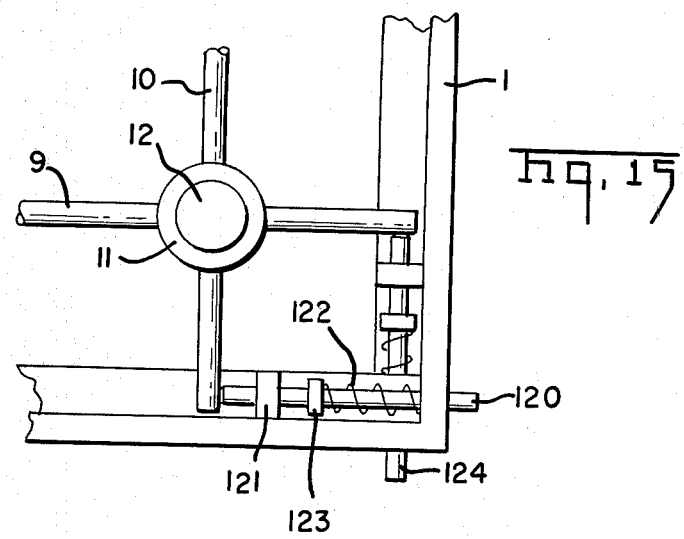
Fig. 15
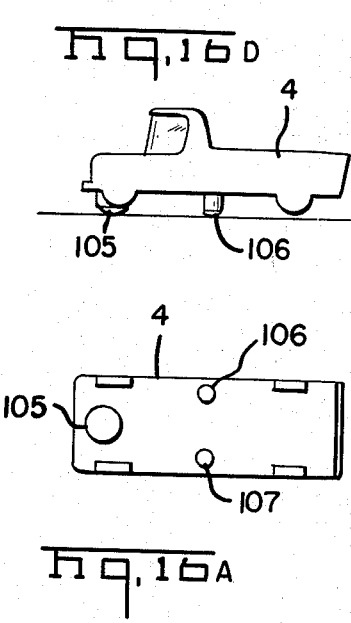
Fig. 16D
Fig. 16A
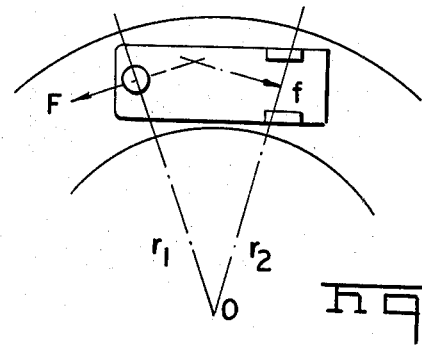
Fig. 16B
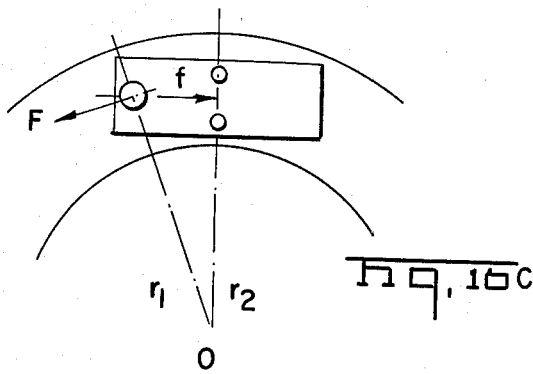
Fig. 16C

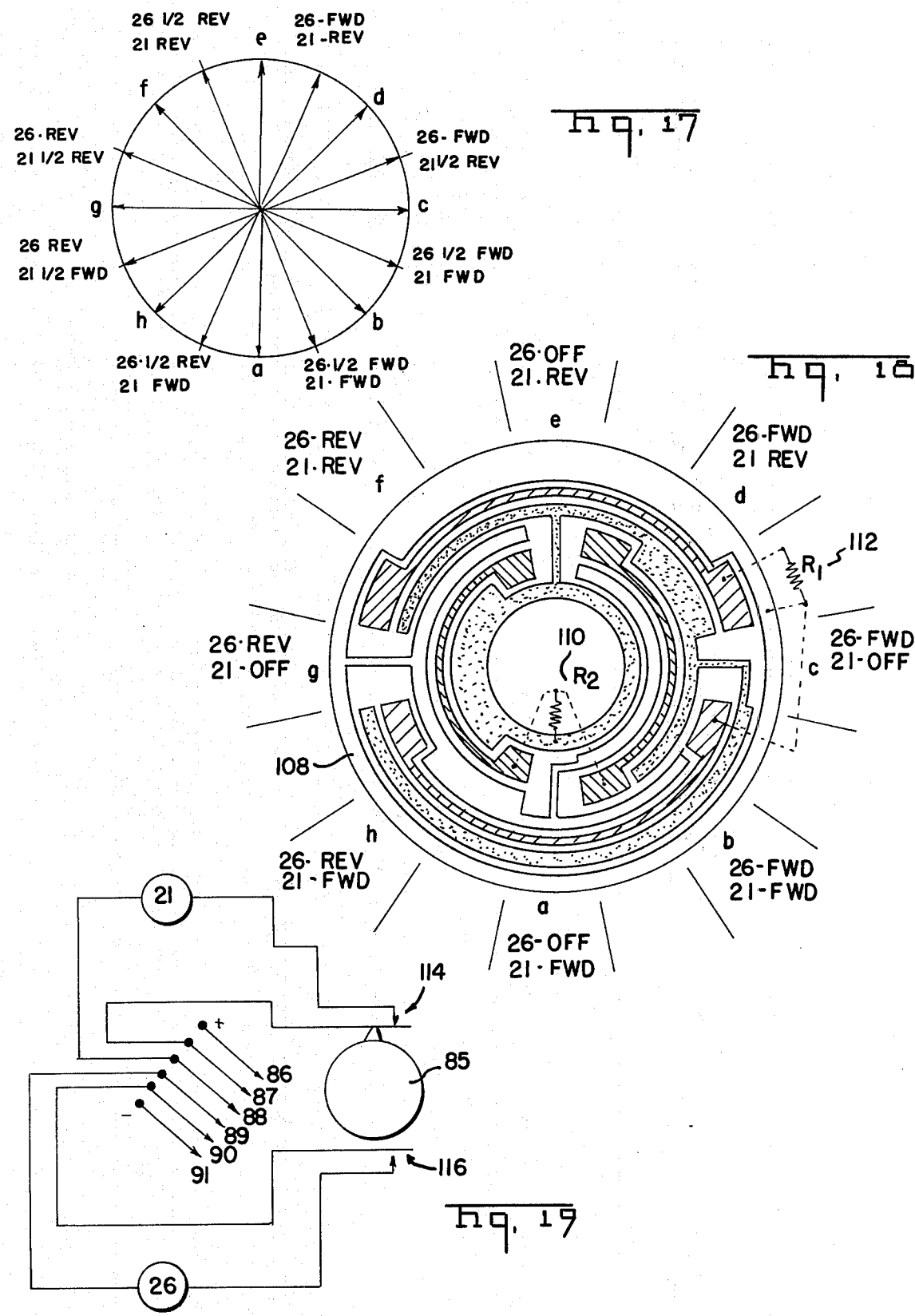

REALISTIC DRIVING TOY

This invention relates to a toy which simulates realistic driving conditions and, more specifically, to such a toy which is relatively simple in operation and inexpensive to manufacture.

Toys which simulate realistic driving conditions and operation have been known in the prior art. A notable example of the prior art is Hinkson U.S. Pat. No. 3,253,364 wherein a driver could steer an automobile over a varied terrain. While this toy had the necessary realistic condition qualities desired, it was unduly complex and expensive where simplicity and manufacturing ease are of primary importance in toy design. In order to overcome these problems, my own invention, U.S. Pat. No. 3,525,175 was provided which overcame the cost objection of the prior art and was commercially successful. However, in order to reduce the complexity of structure and cost of manufacture, the vehicle was confined to a circular path. Therefore, the total realistic driving conditions were somewhat compromised.

Briefly, in accordance with my invention, I have overcome the problems of the prior art and provided a realistic driving toy that is inexpensive to produce and, hence, commercially feasible as a toy and wherein the vehicle is not confined to a circular path but, alternatively, can operate anywhere along a surface.

The toy includes a vehicle driven by a magnet which moves along the vector sum of a pair of moving rods, the rods being movable normal to each other in a plane by means of motors and linking elements. The motors are controlled by a series of contacts which contact a printed circuit disc whereby rotation of a steering wheel rotates the printed circuit disc relative to the contacts to provide different combinations of motor "on-off" conditions as well as different combinations therewith of motor rotation direction conditions to provide magnet movement in eight different directions. In accordance with a second embodiment of printed circuit board, sixteen vector directions for magnet movement are provided by the addition of resistors across certain ones of the circuit paths of the printed circuit board and an alteration of the conductive paths. Provision is made for initial location of the magnet. The rods are driven by a chain, screw or belt drive.

The vehicle includes a forward magnet and a pair of adjacent rearward pins for supporting the vehicle on the board to prevent a "fishtailing" effect upon vehicle movement.

BRIEF DESCRIPTION OF THE DRAWINGS

FIG. 2 is a top view, partly in section, of a first embodiment of the present invention;

FIG. 3 is a vertical section taken along the line 3—3 of FIG. 2;

FIG. 5 is a vertical section taken along the line 5—5 of FIG. 4;

FIG. 6 is an enlarged view of a portion of FIG. 5;

FIG. 7 is a pictorial top view, partly in section, of a third embodiment in accordance with the present invention;

FIG. 8 is a partial vertical section taken along the line 8—8 of FIG. 7;

FIG. 9 is a partial pictorial view of the drive shafts in accordance with the embodiments of FIGS. 7 and 8;

FIG. 11 is a first embodiment of a printed circuit disc for use in accordance with the present invention;

FIG. 12 is a pictorial view of the disc of FIG. 11 and associated electrical contacts;

FIG. 13 is a schematic diagram of the electrical system in accordance with one embodiment of the present invention;

FIG. 14 is an enlarged view of the detent assembly behind wheel 92 of FIG. 5;

FIG. 15 is a pictorial view of a system for determining the location of the magnet in accordance with the present invention;

FIG. 16A is a bottom view of a vehicle which can be used in accordance with the present invention;

FIG. 16B shows the frictional forces on the vehicle with pins 106 and 107 removed;

FIG. 16C shows the frictional forces on the vehicle with pins 106 and 107 present;

FIG. 16D is a top view of the vehicle as in FIG. 16A;

FIG. 17 is a diagram showing vectors differing $22\frac{1}{2}°$ when printed circuit disc 85 is replaced by the printed circuit disc of FIG. 18;

FIG. 18 is a second embodiment of a printed circuit, and

FIG. 19 is an electrical schematic diagram of a further embodiment in accordance with the present invention.

DESCRIPTION OF PREFERRED EMBODIMENTS

Figure 1:
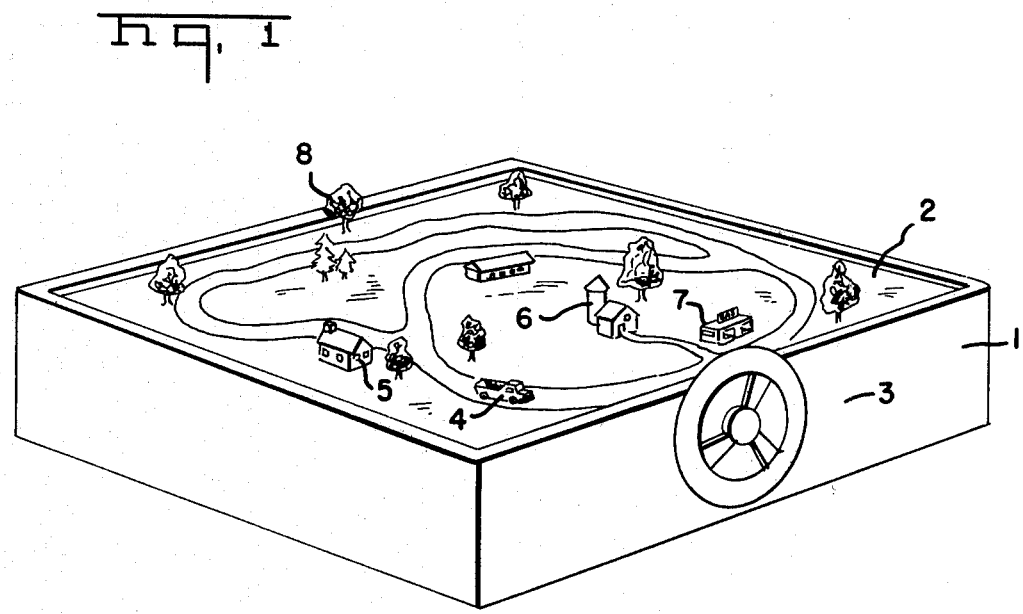
FIG. 1 is a pictorial view of the toy in accordance with the present invention.

Referring now to FIG. 1 there is shown a pictorial view of a first embodiment of the toy in accordance with the present invention having a base 1, a printed playing surface 2 and a steering wheel 3. Operation of the steering wheel 3 will control movement and direction of a vehicle 4 in a manner which will be described in detail hereinbelow. The mechanism for providing vehicle movement is positioned in the base 1 and beneath the playing surface 2. The playing surface includes various three dimensional obstacles such as a house 5, a barn and silo 6, a gasoline station 7, a tree 8 and the like.

Referring now to FIGS. 2 and 3 there is shown a first embodiment of a mechanism for controlling the movement of the vehicle 4 of FIG. 1. The embodiment of FIGS. 2 and 3 includes the base 1 and playing surface 2 thereon with steering wheel 3. Beneath the playing surface 2 are shown crossed rods or bars 9 and 10. These rods are confined to moving in a horizontal plane and are constrained to maintain a perpendicular relationship as will be explained hereinbelow.

A magnet holder 11 carries a magnet 12 and is slidably mounted to both rods 9 and 10. The magnet is closely adjacent to the under side of playing surface 2. It is therefore apparent that a movement of the rod 10 to the left or right as shown in FIG. 2 will move the magnet 12 in that direction and a movement of the rod 9 from front to rear will move the magnet from front to rear. It is also apparent that a movement of both rods 9 and 10 simultaneously in any direction will cause a movement of the magnet holder 11 and magnet 12 in a direction that is the vector sum of the movement of both rods.

One end of the rod 9 rests slidably on the ledge 13 in a wall of the base 1 with the opposite end of the rod being rigidly affixed to a nut 14, the nut 14 engaging a lead screw 15. Both ends of lead screw 15 are rotatably journaled in bearings 16 and 17 in the walls of the base 1. Keyed to one end of the lead screw 15 is a drive pulley 18 which is driven by a belt 19, a motor pulley 20 and a motor/gear drive 21. It is apparent that forward or reverse rotation of motor/gear drive 21 will impart forward or rearward movement to the rod 9 due to rotation of the lead screw 15 caused by rotation of drive pulley 18 which is secured thereto.

In a similar manner, left and right motion will be applied to the rod 10 and the nut 27 when lead screw 22, similar to screw 15, is driven by the drive pulley 23, belt 24 and motor pulley 25 when energized by motor/gear train 26 in the same manner as motor/gear train 21. The remote end of rod 10 also rests on a ledge 100 and rests slidably thereon in the same manner as rod 9. It can therefore be seen that the magnet holder 11 and magnet 12 will move in accordance with the vector sum of the movements of rods 9 and 10.

The arrangement for energizing motor/gear trains 21 and 26 is accomplished in a manner which will be described in greater detail hereinbelow.

Figure 4:
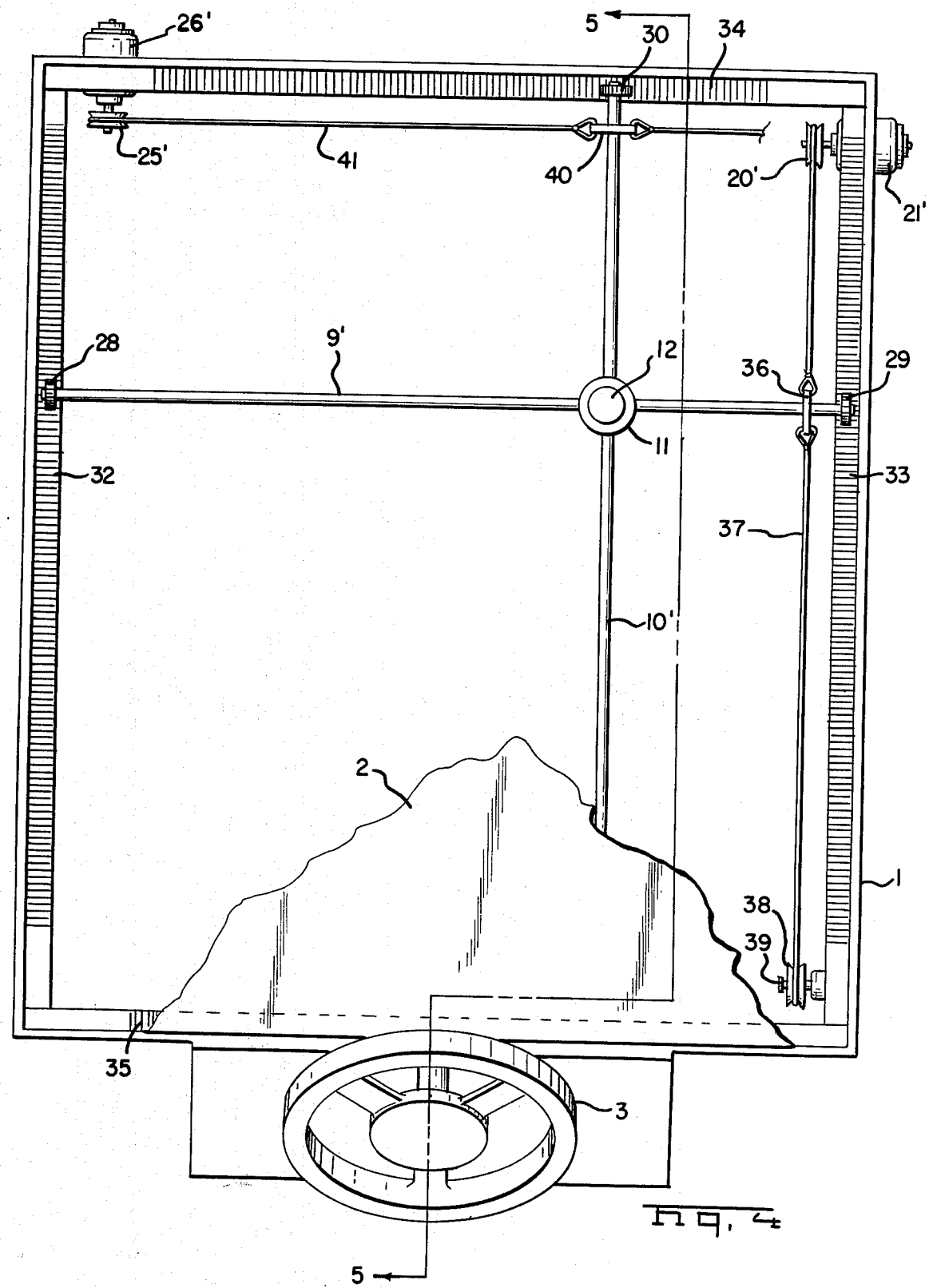
FIG. 4 is a top view, partly in section of a second embodiment in accordance with the present invention.

Referring now to FIGS. 4 and 5, there is shown a second embodiment in accordance with the present invention for use in FIG. 1. In this embodiment, rods 9' and 10' have affixed to one of their ends the gears 28, 29 and 30, 31, respectively, said gears engaging racks 32, 33, 34, and 35 which are secured to the walls of the base 1. These racks can be affixed to the walls or molded integrally with the base 1. It is apparent that as the rods 9' and 10' rotate, they will move laterally while they constantly maintain there perpendicular relationship.

Rotatably attached to rod 9' is a coupling 36 which is forwardly and rearwardly driven by the belt 37, said belt being driven by motor pulley 20' and the motor/gear train 21'. The idler pulley 38 is rotatably journaled on the pin 39 which is pressed into the base 1. The coupling 36 can be a ring completely encircling the rod 9' and secured to belt 37.

In a similar manner, rod 10' is actuated by the coupling 40, which is the same as the coupling 36, and the drive system comprising the motor pulley 25', motor/gear drive 26', belt 41 and another pulley (not shown) which are the same as those discussed hereinabove with reference to rod 9'.

Also affixed to the inner side walls of the base 1 are flanges 42 (omitted in FIGS. 4 and 5 for clarity), which are shown in enlarged detail in FIG. 6. These flanges hold down the ends 101 of rods 9' and 10' and serve to constrain the gears 28, 29, 30 and 31 to their respective racks to maintain the perpendicular relationship of the rods 9' and 10' during movement. The mechanism for controlling operation of the motor/gear drives 21' and 26' is the same as that required for the embodiment of FIGS. 2 and 3 and will be described in detail hereinbelow.

Referring now to FIGS. 7 and 8 there is shown a third embodiment in accordance with the present invention for use with one or two operators. As shown in these Figures as well as in FIG. 9, two pairs of rods 9", 10" and 69, 70 are layered to provide independent control of two separate vehicles. The rod 9" rests slidably on the ledges 43 and 44 and the rod 10" rests on the ledges 45 and 46. The ledges 43, 44, 45 and 46 are secured to or formed in the inner walls of the base 1.

Affixed to both ends of the rod 9" are bead chain couplings 47 and 48, said couplings joining ends of the bead chains 49 and 50 respectively to the rod 9". The bead chains 49 and 50 engage the standard bead-chain sprockets 51 and 52 respectively, both said sprockets being keyed to the drive shaft 53. Sprockets 54 and 55 are not keyed to the drive shaft 56 and hence are idlers. The drive shafts 53 and 56 are journaled in the base 1.

It is apparent that rotation of drive shaft 53 by energizing motor gear train 21" will cause rod 9" to move in a forward or rearward direction, depending upon motor rotation direction. In a similar manner, the rod 10" is driven in a left or right direction by the bead chains 57 and 58, affixed to rod 10" by the couplings 59 and 60. The bead chains 57 and 58 are driven by the sprockets 61 and 62 which are keyed to the drive shaft 63. The sprockets 64 and 65 are not keyed to the drive shaft 66 and hence are idlers. The drive shaft 63 is driven when the motor/gear drive 26" is energized, thus driving rod 10" leftward or rightward while maintaining a perpendicular relationship to rod 9". The magnet 12 will move in accordance with the vector sum of movements of the rod 9" and 10" in the manner discussed hereinabove.

Referring again to FIG. 7, there is shown a second magnet 67 in a magnet carrier 68 which is slidably mounted on the rods 69 and 70 in the same manner as the magnet 12 and magnet holder 11. The magnet 67 and magnet carrier 68 are positioned below the rods 9' and 10' so that they can operate independently. In this instance, the sprockets 71 and 72 are keyed to the drive shaft 56 while the sprockets 73 and 74 idle on the drive shaft 53. Similarly, sprockets 75 and 76 are keyed to drive shaft 66 while sprockets 77 and 78 idle on the drive shaft 63. Thus, the same drive shafts may be used for both levels of operation as clearly shown in the pictorial drawings of FIG. 9. It is apparent that rod 69 is moved forward or backward by bead chains 79 and 80 when motor/gear drive 81 is energized and rod 70 is moved left or right by bead chains 82 and 83 when motor/gear train 84 is energized. The motor/gear train set 21", 26" will be operated by the operator of steering wheel 3 in accordance with a mechanism which is identical to that of the embodiments of FIGS. 2, 3 and FIGS. 4, 5 and will be explained in detail hereinbelow. Similarly, the mechanism for operating the motors 81 and 84 will be operated by the operator of wheel 3' and will be identical to the mechanism used by the operator of wheel 3. The bead chain could be replaced by a perforated tape or film, such as motion picture film-leader.

Many variations of the above are possible for determining the position of an x-y coordinate system. What is provided is a simple, reliable and low cost system that relates the change in direction of a point (magnet and vehicle) in x-y coordinate system to the movement of a steering wheel in a realistic manner.

Figure 10:
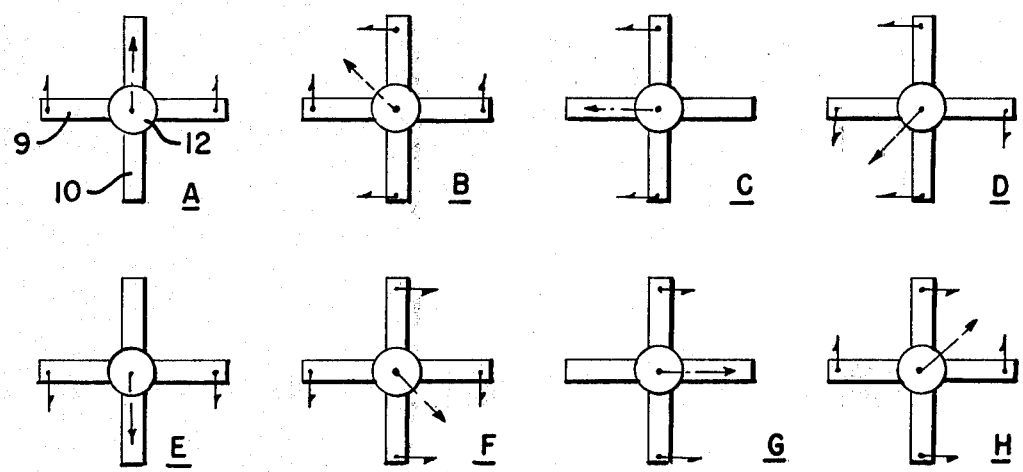
FIG. 10 is a series of schematic drawings showing possible sequential movements of the magnet in accordance with one embodiment of the present invention.

Referring now to FIG. 11, there is shown a printed circuit disc 85 which is used in conjunction with contacts as shown in FIG. 12 to provide eight different directions of motion to a vehicle as shown in FIG. 10. With reference now to FIGS. 10 thru 12, the disc 85 includes eight different sectors labelled A thru H as shown in FIG. 11. Also, viewing the disc in a circular manner, it can be seen that there are six concentric electrically conductive areas labelled r thru w. The disc 85 is rotated by rotation of the steering wheels 3 and/or 3' as will be described in detail hereinbelow. The contacts 86 thru 91 each contact one of the concentric circular areas r thru w on the disc respectively. The arrangement of the contacts 86 thru 91 with the motor/gear train 21 and 26 is shown in detail in FIG. 13. In FIG. 10, the small arrows at the extremities of the bars 9 and 10 are vectors indicating movement of the bars whereas the large arrows emanating from the magnets 12 are the vector sum of the bar movements and therefore indicate the movement of the magnet. It can therefore be seen that when the contacts 86 thru 91 are in sector C of FIG. 11, motor 26 will be turning in a forward direction and 21 will be off. Assuming upward and leftward movement as "forward" for bars 9 and 10 as well as for corresponding rotations of motors 21 and 26 respectively, this will provide movement of the magnet 12 in a leftward direction as shown by the vectors in FIG. 10C. When the contacts are in sector B of FIG. 11, motor 21 will move forward and 26 will move forward to provide the motion as shown by the vectors in FIG. 10B. When the contacts are in sector A of FIG. 11, motor 26 will be off and motor 21 will move in a forward direction to provide motion as shown in FIG. 10A. When the contacts are in sector H of FIG. 11, the motor 26 will move in a reverse direction and motor 21 will move in a forward direction to provide the movement as shown in FIG. 10H. When the contacts are in section G, motor 26 will be rotated in a reverse direction and motor 21 will be off to provide the movement as shown in FIG. 10G. When the contacts are in sector F, motor 21 will be moving in a reverse direction and motor 26 will be moving in a reverse direction to provide vehicle movement as shown in FIG. 10F. When the contacts are in sector E, motor 26 will be off and motor 21 will be moving in a reverse direction to provide movement as shown in FIG. 10E. When the contacts are in sector D of FIG. 11, motor 26 will move in a forward direction and motor 21 will move in a reverse direction to provide movement as shown in FIG. 10D. It can therefore be seen that by selectively positioning the contacts in one of the eight sectors on the disc 85, motion can be provided in any one of eight different directions as shown in FIG. 10.

As can be seen, each subsequent sector of the printed circuit disc 85 will change the direction of the vehicle by increments of 45°. This seemingly large change is not at all objectionable in actual operation of the working model, and the control of the vehicle is extremely realistic and satisfying. It is possible, however, at slight additional cost to reduce the magnitude of said incremental changes by the means described in FIGS. 17, 18 and 19. FIG. 17 is a diagram showing vectors differing by increments of 22½° and the function of motors 21 and 26 that will move the vehicle in a specific direction.

This is accomplished by causing each motor to run forward or reversed in proper sequence, as before, and, in addition, to run the motors at full or half speed as indicated in FIG. 17. FIG. 18 is a printed circuit disc 108 consisting of 16 sectors, each sector divided into electrically conductive concentric rings, each circular ring sector having the required polarity by virtue of its connection to the positive outermost ring or the negative innermost ring as in FIG. 11.

In addition, there are eight concentric ring sectors identified by cross hatching, said cross hatched areas being indirectly connected to the outer positive ring or the inner negative ring by resistors 110 and 112 of such value as to reduce the speed of the motors by one half.

The resistor 112 is shown at the periphery of the disc and is connected to the outer positive ring and the circular arc sectors that provide reduced voltage to the motor 21. In practice said resistor could be mounted on the rear of the printed circuit board 108.

Similarly, the resistor 110 connects the inner negative ring to the circular arc sectors that provide reduced voltage to the motor 26.

Another means is shown in the electrical schematic of the FIG. 19. In this alternative the resistors are connected in series with each motor and the switches 114 and 116 are connected across the resistors. In this manner, a resistor is shorted and inoperative when the switch is closed, said switches being opened and closed in proper sequence by cam lobes integral with the periphery of the printed circuit disc.

The location of printed circuit discs 85 or 108 and contacts 86 through 91 is shown in detail in FIGS. 3, 5 and 8. The disc 85 is affixed to the wheel 92. The wheel 92 and the steering wheel 3 are both keyed to the shaft 93 which rotates in the bearing 94 in the base 1.

Although not absolutely necessary, the operation of the toy is enhanced by the addition of a detent assembly that gives a tactile indication of the various positions of the steering wheel 3 or 3'. FIG. 5 shows the addition of said detent assembly behind the wheel 92, said assembly also shown in enlarged detail in FIG. 14. The star wheel 95 of FIG. 14 has eight lobes and eight depressions corresponding to eight segments of the printed circuit disc 85. The detent roller 96 is rotatably mounted to the arm 97, said arm being pivotally mounted to the base 1 by the pin 98. The detent roller is biased against the star wheel 95 by the spring 99 in such a manner that the roller engages the depression of the star wheel when the contacts 86 thru 91 are centered in a segment of the printed circuit disc 85. The star wheel could also have sixteen lobes to accommodate the disc of FIG. 18.

The velocity of the vehicle in its chosen direction can also be controlled by providing a rheostat of the type disclosed in my prior U.S. Pat. No. 3,525,175. In this case, a foot pedal would be used which controls a rheostat which is in series with the battery 102 of FIG. 13. Operation of the foot pedal would regulate the amount of current flowing to the motors 21 and 26 or, in the two player embodiment to the motors 21", 26", 81 and 84 to allow control of motor speed and, thereby, vehicle speed on the playing surface.

Since the magnet is hidden beneath the playing board 2, it is necessary to provide a manner whereby the position of the magnet can be known initially so that a vehicle 4 can be placed on the surface 2 over the magnet 12. This is accomplished by the system as shown in FIG. 15. In accordance with this system, there is shown shouldered pin 120 which lies in the path of the rod 10 and is slidably journaled in the base 1 and the outboard bearing 121. Pin 120 is biased inwardly by the face of a compression spring 122 against the shoulder 123.

When rod 10 moves to its extreme right position, it will move the pin 120 rightward until its outer end becomes visible outside the base 1 as shown in FIG. 15. Thus, there is an indication that the magnet 12 is in its extreme rightward position. A similar indicator pin 124 in the path of rod 9 will indicate that the magnet is in its extreme frontward position. Thus, the magnet location would be known and the vehicle 4 can then be placed thereover for commencement of operation.

It is important that the vehicle 4 turn in a realistic manner as it follows the changing movement of the magnet 12. A simple low cost method for achieving this is shown in FIGS. 16a thru 16d. The vehicle 4 has a small magnet 105 affixed to its front end and two pins 106, 107 midway on its underside, said magnet and pins extending below the bottom of the vehicle wheels. The vehicle therefore rests on the magnet and pins and the wheels are merely simulated.

If the pins 106 and 107 were not present and the vehicle rested on the magnet and rear wheels, the force acting on the vehicle would be as shown in FIG. 16b. In this diagram, the vehicle is shown traversing a circular path with point 0 as an instant center of rotation. The force F is pulling the magnet along the line perpendicular to $r_1$ while the resisting frictional force F acts perpendicular to $r_2$, causing the vehicle to "fishtail" inwardly in an unrealistic manner. In FIG. 16c, the frictional force F is perpendicular to a line through the center of the pins 106 and 107, thus said frictional force acts along the axis of the vehicle, causing the vehicle to follow an arc about the instant center 0. It can be seen that the embodiment of FIGS. 16a and 16d which provides motion as shown in FIG. 16c is realistic and prevents the "fishtailing" effect.

Though the invention has been described with respect to specific preferred embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. A driving toy which comprises, in combination
   (a) a housing including a playing surface,
   (b) a vehicle positionable on said playing surface and having a first element of magnetic material secured thereto, and
   (c) control means for controlling movement of said vehicle, said control means comprising,
   (d) a second element of magnetic material positioned beneath said playing surface and magnetically couplable to said first element of magnetic material, at least one of said elements being a magnet,
   (e) first means coupled to said second element for moving said second element along a first line, second means coupled to said second element for moving said second element along a second line different from said first line, a first motor at a fixed location coupled to said first means and controlled by said steering means for selective movement of said first means and a second motor at a fixed location coupled to said second means and controlled by said steering means for selective movement of said second means,
   (f) disc means having plural sets of electrically conductive areas thereon for controlling movement of said second element of magnetic material via said means coupled to said second element, and
   (g) steering means for selectively contacting a predetermined set of said electrically conductive areas.

2. A driving toy as set forth in claim 1 wherein said plural sets of electrically conductive areas comprises a plurality of concentric discontinuous electrically conductive bands, each said set being formed by a predetermined sector of said concentric bands.

3. A driving toy as set forth in claim 1 wherein said steering means includes a rotatable wheel and plural sets of electrically conductive wipers contacting said disc means, each wiper contacting a unique one of said areas and movable thereover.

4. A driving toy as set forth in claim 2 wherein said steering means includes a rotatable wheel and plural sets of electrically conductive wipers contacting said disc means, each wiper contacting a unique one of said areas and movable thereover.

5. A driving toy as set forth in claim 1 wherein said first means includes a first threaded shaft journalled for rotation in said housing and rotated by said first motor, said second means includes a second threaded shaft journalled for rotation in said housing and rotated by said second motor, a first threaded nut threadedly engaging said first shaft and coupled to said second element and a second threaded nut threadedly engaging said second shaft and coupled to said second element.

6. A driving toy as set forth in claim 2 wherein said first means includes a first threaded shaft journalled for rotation in said housing and rotated by said first motor, said second means includes a second threaded shaft journalled for rotation in said housing and rotated by said second motor, a first threaded nut threadedly engaging said first shaft and coupled to said second element and a second threaded nut threadedly engaging said second shaft and coupled to said second element.

7. A driving toy as set forth in claim 1 wherein said first means includes a first pair of parallel racks secured in opposite walls of said housing, and said second means includes a second pair of parallel tracks secured in different opposite walls of said housing, a first pair of gears engaging said first pair of racks, a second pair of gears engaging said second pair of racks, first element engaging means coupled to said first pairs of gears and said second element, second element engaging means coupled to said second pair of gears and said second element, first means coupled to said first motor and said first element engaging means for moving said first element engaging means in a direction parallel to said first pair of racks, and second means coupled to said second motor and said second element engaging means for moving said second element engaging means in a direction parallel to said second pair of racks.

8. A driving toy as set forth in claim 2 wherein said first means includes a first pair of parallel racks secured in opposite walls of said housing, and said second means includes a second pair of parallel racks secured in different opposite walls of said housing, a first pair of gears engaging said first pair of racks, a second pair of gears engaging said second pair of racks, first element engaging means coupled to said first pair of gears and said second element, second element engaging means coupled to said second pair of gears and said second element, first means coupled to said first motor and said first element engaging means for moving said first element engaging means in a direction parallel to said first pair of racks, and second means coupled to said second motor and said second element engaging means for moving said second element engaging means in a direction parallel to said second pair of racks.

9. A driving toy as set forth in claim 1 wherein said first means includes a first pair of pulleys, a first pair of belts mounted on said first pair of pulleys, first means coupled to said first motor and one of said first pair of pulleys for rotating said one of said first pair of pulleys, first means journalling the other of said first pair of pulleys for rotaton therein and first means coupled to said first pair of belts and said second element for movement with said first pair of belts, said second means including a second pair of pulleys, a second pair of belts mounted on said second pair of pulleys, second means coupled to said second motor and one of said second pair of pulleys for rotating said one of said second pair of pulleys, second means journalling the other of said second pair of pulleys for rotation therein and second means coupled to said second pair of belts and said second element for movement with said second pair of belts.

10. A driving toy as set forth in claim 2 wherein said first means includes a first pair of pulleys, a first pair of belts mounted on said first pair of pulleys, first means coupled to said first motor and one of said first pair of pulleys for rotating said one of said first pair of pulleys, first means journalling the other of said first pair of pulleys for rotation therein and first means coupled to said first pair of belts and said second means including a second pair of pulleys, a second pair of belts mounted on said second pair of pulleys, second means coupled to said second motor and one of said second pair of pulleys for rotating said one of said second pair of pulleys, second means journalling the other of said second pair of pulleys for rotation therein and second means coupled to said second pair of belts and said second element for movement with said second pair of belts.

11. A driving toy as set forth in claim 3 further including a star wheel coupled to and rotatable with said wheel and a detent biased for normal engagement between the teeth of said star wheel.

12. A driving toy as set forth in claim 4 further including a star wheel coupled to and rotatable with said wheel and a detent biased for normal engagement between the teeth of said star wheel.

13. A driving toy as set forth in claim 1 including further means, other than said second element of magnetic material, responsive to the presence of each of said first and second movable means at a predetermined point in its movement for producing an indication that the second element of magnetic material is at a predetermined point relative to said playing surface.

14. A driving toy as set forth in claim 2 including further means, other than said second element of magnetic material, responsive to the presence of each of said first and second movable means at a predetermined point in its movement for producing an indication that the second element of magnetic material is at a predetermined point relative to said playing surface.

15. A driving toy as set forth in claim 3 including further means, other than said second element of magnetic material, responsive to the presence of each of said first and second movable means at a predetermined point in its movement for producing an indication that the second element of magnetic material is at a predetermined point relative to said playing surface.

16. A driving toy as set forth in claim 4 including further means, other than said second element of magnetic material, responsive to the presence of each of said first and second movable means at a predetermined point in its movement for producing an indication that the second element of magnetic material is at a predetermined point relative to said playing surface.

17. A driving toy as set forth in claim 5 including further means, other than said second element of magnetic material, responsive to the presence of each of said first and second movable means at a predetermined point in its movement for producing an indication that the second element of magnetic material is at a predetermined point relative to said playing surface.

18. A driving toy as set forth in claim 6 including further means, other than said second element of magnetic material, responsive to the presence of each of said first and second movable means at a predetermined point in its movement for producing an indication that the second element of magnetic material is at a predetermined point relative to said playing surface.

19. A driving toy as set forth in claim 7 including further means, other than said second element of magnetic material, responsive to the presence of each of said first and second movable means at a predetermined point in its movement for producing an indication that the second element of magnetic material is at a predetermined point relative to said playing surface.

20. A driving toy as set forth in claim 8 including further means, other than said second element of magnetic material, responsive to the presence of each of said first and second movable means at a predetermined point in its movement for producing an indication that the second element of magnetic material is at a predetermined point relative to said playing surface.

21. A driving toy as set forth in claim 9 including further means, other than the said second element of magnetic material, responsive to the presence of each of said first and second movable means at a predetermined point in its movement for producing an indication that the second element of magnetic material is at a predetermined point relative to said playing surface.

22. A driving toy as set forth in claim 10 including further means, other than the said second element of magnetic material, responsive to the presence of each of said first and second movable means at a predetermined point in its movement for producing an indication that the second element of magnetic material is at a predetermined point relative to said playing surface.

23. A driving toy as set forth in claim 11 including further means, other than the said second element of magnetic material, responsive to the presence of each of said first and second movable means at a predetermined point in its movement for producing an indication that the second element of magnetic material is at a predetermined point relative to said playing surface.

24. A driving toy as set forth in claim 12 including further means, other than the said second element of magnetic material, responsive to the presence of each of said first and second movable means at a predetermined point in its movement for producing an indication that the second element of magnetic material is at a predetermined point relative to said playing surface.

* * * * *